(12) United States Patent
Bock

(10) Patent No.: US 10,425,601 B1
(45) Date of Patent: Sep. 24, 2019

(54) THREE-TRANSISTOR ACTIVE RESET PIXEL

(71) Applicant: InVisage Technologies, Inc., Newark, CA (US)

(72) Inventor: Nikolai E. Bock, San Jose, CA (US)

(73) Assignee: INVISAGE TECHNOLOGIES, INC., Newark, CA (US)

( * ) Notice: Subject to any disclaimer, the term of this patent is extended or adjusted under 35 U.S.C. 154(b) by 0 days.

(21) Appl. No.: 15/953,458

(22) Filed: Apr. 15, 2018

Related U.S. Application Data

(60) Provisional application No. 62/502,390, filed on May 5, 2017.

(51) Int. Cl.
*H04N 5/363* (2011.01)
*H04N 5/3745* (2011.01)
*H04N 5/378* (2011.01)

(52) U.S. Cl.
CPC ............ *H04N 5/363* (2013.01); *H04N 5/378* (2013.01); *H04N 5/3745* (2013.01)

(58) Field of Classification Search
CPC ....... H04N 5/363; H04N 5/3745; H04N 5/378
See application file for complete search history.

(56) References Cited

U.S. PATENT DOCUMENTS

| | | | |
|---|---|---|---|
| 5,648,660 A | 7/1997 | Lee et al. | |
| 5,717,458 A | 2/1998 | Yonemoto | |
| 6,133,862 A | 10/2000 | Dhuse et al. | |
| 6,317,154 B2 | 11/2001 | Beiley et al. | |
| 6,493,030 B1 | 12/2002 | Kozlowski et al. | |
| 6,911,640 B1 | 6/2005 | Bencuya et al. | |
| 7,078,670 B2 | 7/2006 | Atlas et al. | |
| 7,561,194 B1 | 7/2009 | Luo et al. | |
| 7,773,404 B2 | 8/2010 | Sargent et al. | |
| 7,923,801 B2 | 4/2011 | Tian et al. | |
| 7,923,802 B2 | 4/2011 | Tian et al. | |
| 8,223,234 B2 | 7/2012 | Inuiya et al. | |

(Continued)

FOREIGN PATENT DOCUMENTS

WO   2008131313 A2   10/2008

OTHER PUBLICATIONS

U.S. Appl. No. 15/269,659 office action dated Jun. 18, 2018.

(Continued)

*Primary Examiner* — Mekonnen D Dagnew
(74) *Attorney, Agent, or Firm* — Kligler & Associates

(57) ABSTRACT

Imaging apparatus includes a photosensitive medium, which is configured to convert incident photons into charge carriers. An array of three-transistor (3T) pixel circuits, coupled to the photosensitive medium, is arranged in rows and columns on a semiconductor substrate and collects the charge carriers from the photosensitive medium. A readout circuitry includes a plurality of column readout lines; each column readout line is coupled to respective outputs of the pixel circuits in a corresponding column of the array and includes a current source load coupled between a constant-voltage supply and the outputs of the pixel circuits, and a bypass switch in parallel with the current source load. Control circuitry alternately opens the bypass switch on each column readout line during a signal readout phase and closes the bypass switch during a pixel reset phase.

16 Claims, 3 Drawing Sheets

(56) References Cited

U.S. PATENT DOCUMENTS

| | | | |
|---|---|---|---|
| 8,736,733 | B2 | 5/2014 | Tian et al. |
| 9,451,188 | B2 | 9/2016 | Tian et al. |
| 9,456,159 | B1 | 9/2016 | Hynecek |
| 9,491,383 | B2 * | 11/2016 | Boisvert .............. H04N 5/378 |
| 9,871,160 | B2 | 1/2018 | Tian et al. |
| 10,225,504 | B2 * | 3/2019 | Tian ................ H04N 5/3575 |
| 2002/0017612 | A1 | 2/2002 | Yu et al. |
| 2004/0119853 | A1 | 6/2004 | Kokubun et al. |
| 2004/0160522 | A1 | 8/2004 | Fossum et al. |
| 2004/0174449 | A1 | 9/2004 | Lee et al. |
| 2005/0104089 | A1 | 5/2005 | Engelmann et al. |
| 2005/0205879 | A1 | 9/2005 | Fukunaga |
| 2005/0248674 | A1 | 11/2005 | Mabuchi et al. |
| 2006/0181629 | A1 | 8/2006 | Miyashita et al. |
| 2007/0051943 | A1 | 3/2007 | Lee et al. |
| 2007/0052055 | A1 | 3/2007 | McKee |
| 2007/0076093 | A1 | 4/2007 | Misawa |
| 2007/0076108 | A1 | 4/2007 | Misawa |
| 2007/0132052 | A1 | 6/2007 | Sargent et al. |
| 2007/0164333 | A1 | 7/2007 | Wright |
| 2007/0228503 | A1 | 10/2007 | Yokoyama |
| 2008/0173964 | A1 | 7/2008 | Akram |
| 2008/0284884 | A1 | 11/2008 | Makino et al. |
| 2009/0027529 | A1 | 1/2009 | Jung et al. |
| 2009/0290059 | A1 | 11/2009 | Suzuki |
| 2010/0002113 | A1 | 1/2010 | Ota |
| 2010/0053386 | A1 | 3/2010 | Sizukuisi et al. |
| 2010/0060769 | A1 | 3/2010 | Inuiya |
| 2010/0140732 | A1 | 6/2010 | Eminoglu et al. |
| 2010/0201856 | A1 | 8/2010 | Hayashi et al. |
| 2010/0276670 | A1 | 11/2010 | Shen et al. |
| 2011/0049665 | A1 | 3/2011 | Goto |
| 2011/0069210 | A1 | 3/2011 | Ogura et al. |
| 2011/0216212 | A1 | 9/2011 | Watanabe et al. |
| 2011/0228144 | A1 | 9/2011 | Tian et al. |
| 2012/0074297 | A1 | 3/2012 | Yonekura et al. |
| 2012/0173175 | A1 | 7/2012 | Devicharan et al. |
| 2012/0200752 | A1 | 8/2012 | Matsunaga et al. |
| 2012/0268635 | A1 | 10/2012 | Furuta et al. |
| 2013/0075593 | A1 | 3/2013 | Williams et al. |
| 2013/0208157 | A1 | 8/2013 | Bechtel et al. |
| 2013/0277536 | A1 | 10/2013 | Mizuno et al. |
| 2014/0054466 | A1 | 2/2014 | Kurokawa et al. |
| 2014/0131554 | A1 | 5/2014 | Ishii et al. |
| 2014/0146211 | A1 | 5/2014 | Mori et al. |
| 2014/0175591 | A1 | 6/2014 | Tian et al. |
| 2014/0284663 | A1 | 9/2014 | Meinhold et al. |
| 2014/0313386 | A1 | 10/2014 | Jiang et al. |
| 2015/0015747 | A1 | 1/2015 | Hizi |
| 2015/0015759 | A1 | 1/2015 | Kavakan et al. |
| 2015/0070544 | A1 | 3/2015 | Smith et al. |
| 2015/0304582 | A1 | 10/2015 | Hirota |
| 2015/0319386 | A1 | 11/2015 | Brady et al. |
| 2015/0357360 | A1 | 12/2015 | Tian et al. |
| 2016/0037070 | A1 | 2/2016 | Mandelli et al. |
| 2016/0037099 | A1 | 2/2016 | Mandelli et al. |
| 2016/0037114 | A1 | 4/2016 | Mandelli et al. |
| 2016/0155882 | A1 | 6/2016 | Tian et al. |
| 2017/0013218 | A1 | 1/2017 | Tian et al. |
| 2017/0054928 | A1 | 2/2017 | Boisvert et al. |
| 2017/0201693 | A1 | 7/2017 | Sugizaki et al. |
| 2017/0208273 | A1 | 7/2017 | Mandelli et al. |
| 2017/0264836 | A1 | 9/2017 | Mandelli et al. |
| 2018/0027193 | A1 | 1/2018 | Bock et al. |
| 2018/0175102 | A1 | 6/2018 | Togashi et al. |

OTHER PUBLICATIONS

U.S. Appl. No. 15/657,068 office action dated Oct. 18, 2018.

Pain et al., "Reset Noise Suppression in Two-Dimensional CMOS Photodiode Pixels through Column-based Feedback-Reset", International Electron Devices Meeting, San Fransisco, Session 32.5, 4 pages, Dec. 8-11, 2002.

International Application # PCT/US17/57094 search report dated Jan. 17, 2018.

Fowler et al., "Low Noise Readout using Active Reset for CMOS APS", Proceedings SPIE, vol. 3965, Sensors and Camera Systems for Scientific, Industrial, and Digital, 10 pages, 2000.

Kozlowski et al., "Pixel Noise Suppression via SoC Management of Tapered Reset in a 1920×1080 CMOS Image Sensor", IEEE Journal of Solid-State Circuits, vol. 40, 42 pages, Jan. 2006.

Ishii et al., "An Ultra-low Noise Photoconductive Film Image Sensor With a High-speed Column Feedback Amplifier Noise Canceller", Dig. VLSI Circuits, pp. C8-C9, Jun. 2013.

Kapusta et al., "Sampling Circuits That Break the kT/C Thermal Noise Limit", IEEE Journal of Solid-State Circuits, vol. 49, No. 8, pp. 1694-1701, Aug. 2014.

* cited by examiner

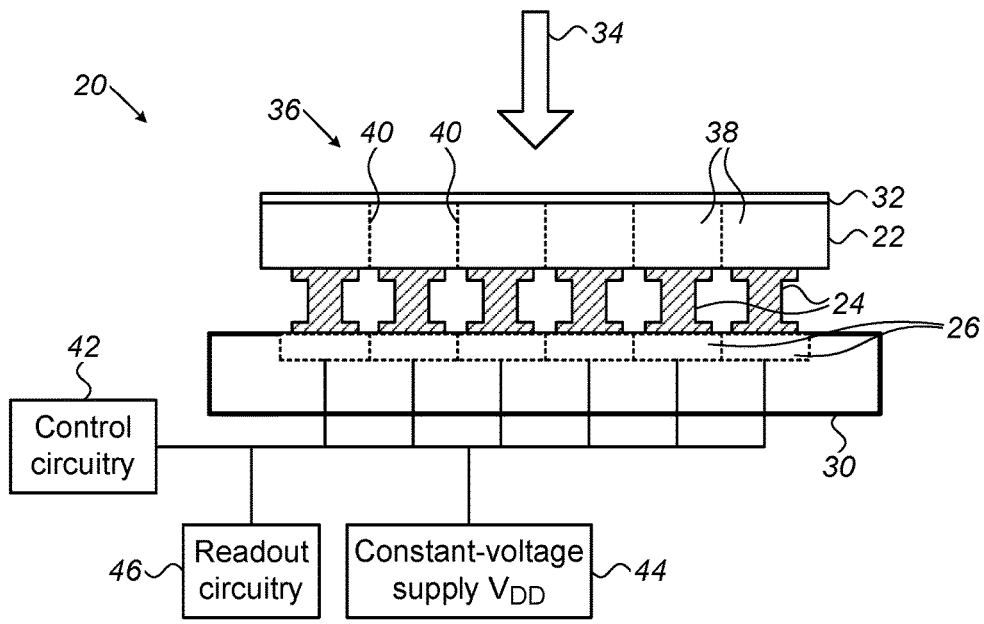
FIG. 1
FIG. 2
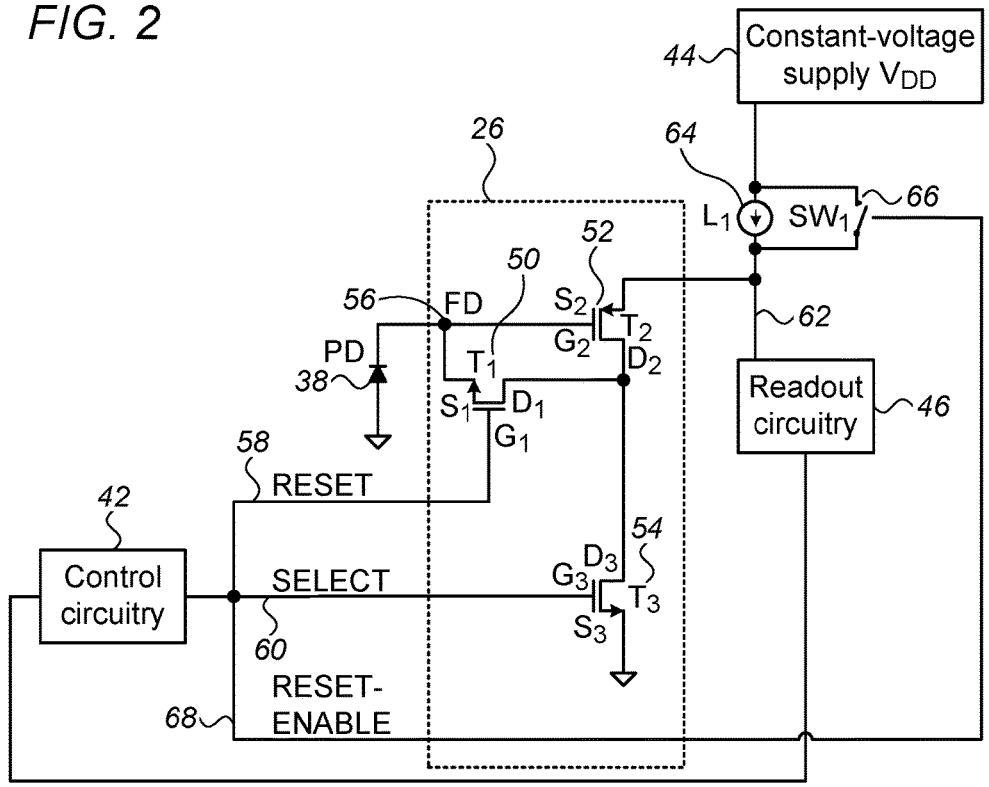

THREE-TRANSISTOR ACTIVE RESET PIXEL

CROSS-REFERENCE TO RELATED APPLICATION

This application claims the benefit of U.S. Provisional Patent Application 62/502,390, filed May 5, 2017, which is incorporated herein by reference.

FIELD OF THE INVENTION

The present invention relates generally to optoelectronic devices, and particularly to optoelectronic image sensors.

BACKGROUND

A typical three-transistor (3T) pixel of an optoelectronic image sensor suffers from high reset noise, which limits the signal-to-noise ratio (SNR) and dynamic range of the pixel. A common noise component in these image sensors is kTC noise, wherein C is the switch capacitance of the field-effect transistor (FET) gate, k is Boltzmann's constant, and T is the absolute temperature (measured in ° K).

Active pixel reset is a known method for suppressing kTC noise in a 3T pixel. For this purpose, a dedicated operational amplifier is typically coupled to each column adjacent to the pixel array. Designs of this sort are described, for example, by B. Fowler et al., "*Low Noise Readout using Active Reset for CMOS APS*," Proc. SPIE 3965, Sensors and Camera Systems for Scientific, Industrial, and Digital Photography Applications, p. 126, SPIE Press, Bellingham, Wash., 2000, as well as M. Ishii et al., "*An Ultra-low Noise Photoconductive Film Image Sensor with a High-speed Column Feedback Amplifier Noise Canceller*," IEEE 2013 SYMPOSIUM ON VLSI CIRCUITS, pp. C8-C9, June 2013, IEEE, New York, N.Y. A distributed feedback amplifier for kTC noise suppression in 3T pixels was proposed by L. Kozlowski et al. in "*Pixel Noise Suppression via SoC Management of Tapered Reset in a 1920×1080 CMOS Image Sensor*," IEEE Journal of Solid-State Circuits, vol. 40, pp. 2766-2776, December 2005, IEEE, New York, N.Y.

SUMMARY

Embodiments of the present invention that are described hereinbelow provide improved circuitry and methods for controlling an image sensor.

There is therefore provided, in accordance with an embodiment of the invention, imaging apparatus, including a photosensitive medium configured to convert incident photons into charge carriers. An array of three-transistor (3T) pixel circuits is coupled to the photosensitive medium and is arranged in rows and columns on a semiconductor substrate and configured to collect the charge carriers from the photosensitive medium. There is further provided a constant-voltage supply. A readout circuitry includes a plurality of column readout lines, wherein each column readout line is coupled to respective outputs of the pixel circuits in a corresponding column of the array and includes a current source load coupled between the constant-voltage supply and the outputs of the pixel circuits, and a bypass switch in parallel with the current source load. Control circuitry is coupled to alternately open the bypass switch on each column readout line during a signal readout phase, in which the collected charge carriers are read out of the pixel circuits, and to close the bypass switch during a pixel reset phase, in which the pixel circuits are reset.

In a disclosed embodiment, the photosensitive medium includes a photosensitive film.

In further embodiments, each of the 3T pixel circuits includes a floating diffusion node coupled to collect the charge carriers from the photosensitive medium; a reset transistor having a first gate coupled to receive a reset signal from the control circuitry, a first source connected to the floating diffusion node, and a first drain; an amplifier transistor having a second gate connected to the floating diffusion node, a second drain connected to the first drain, and a second source connected to one of the column readout lines; and a select transistor having a third gate coupled to receive a select signal from the control circuitry, a third drain connected to the first and second drains, and a third source connected to a ground potential. In some embodiments the reset and select transistors include nMOS transistors, and the amplifier transistor includes a pMOS transistor.

In further embodiments, the control circuitry is configured to provide a tapered reset signal to the pixel circuits while the bypass switch is closed. In some embodiments, the tapered reset signal has a falling edge having a taper length of at least 100 ns. In still further embodiments, the control circuitry is configured to apply the tapered reset signal to multiple rows of the array simultaneously.

In some embodiments the control circuitry is configured to reopen the bypass switch on each column readout line during a reset read phase, following the pixel reset phase.

There is also provided, in accordance with an embodiment of the present invention, a method for image sensing, the method including providing a photosensitive medium configured to convert incident photons into charge carriers with an array of three-transistor (3T) pixel circuits arranged in rows and columns on a semiconductor substrate and configured to collect the charge carriers from the photosensitive medium. The method further includes coupling readout circuitry, including a plurality of column readout lines, to respective outputs of the pixel circuits in corresponding columns of the array, each column readout line including a current source load coupled between a constant-voltage supply and the outputs of the pixel circuits, and a bypass switch in parallel with the current source load; and alternately opening the bypass switch on each column readout line during a signal readout phase, in which the collected charge carriers are read out of the pixel circuits, and closing the bypass switch during a pixel reset phase, in which the pixel circuits are reset.

The present invention will be more fully understood from the following detailed description of the embodiments thereof, taken together with the drawings in which:

BRIEF DESCRIPTION OF THE DRAWINGS

FIG. 1 is a schematic sectional view of an image sensor, in accordance with an embodiment of the invention;

FIG. 2 is a schematic circuit diagram of a 3T pixel circuit and its associated circuitry, in accordance with an embodiment of the invention;

DETAILED DESCRIPTION OF EMBODIMENTS

Overview

Figure 3:
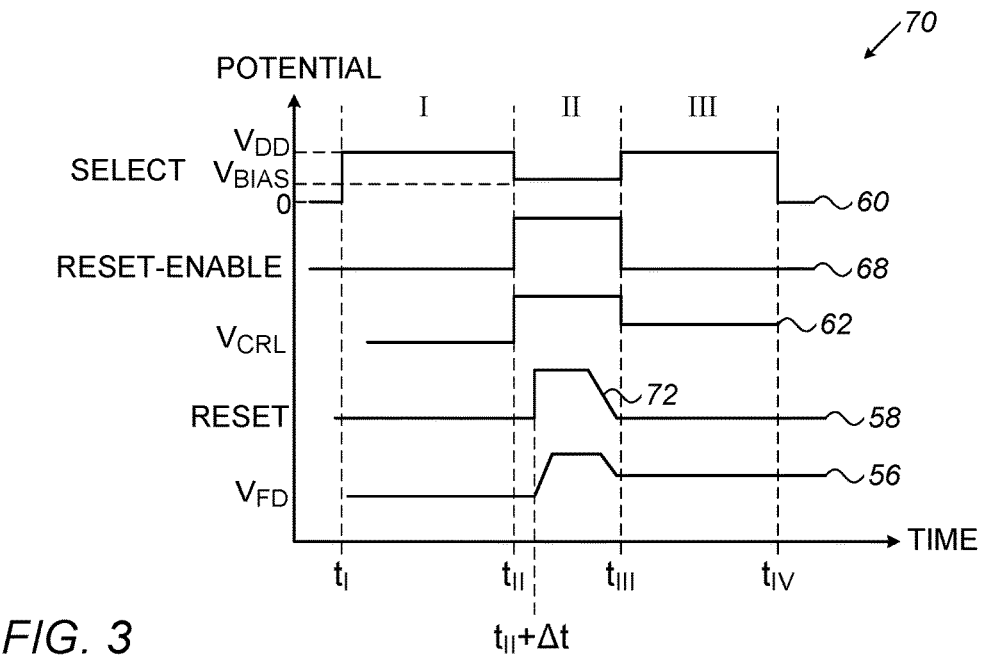
FIG. 3 is a timing diagram that schematically illustrates the operation of the circuitry of FIG. 2, in accordance with an embodiment of the invention.

Active pixel reset is a known method for suppressing kTC noise in a 3T pixel circuit in an image sensor. The active reset approach is based on an amplifier with negative feedback, using a tapered reset signal. Existing approaches use a reset amplifier in the column readout circuit, and the column readout line is part of the amplifier feedback loop. The high capacitance of the column readout line may slow down the reset. Moreover, when the column readout line is used as a part of the feedback loop, only one row of pixels in the image sensor can be reset at a time. Additionally, these existing approaches consume substantial power and chip area.

Embodiments of the present invention that are described herein provide apparatus and methods to mitigate these problems by providing an in-pixel reset amplifier that can be reconfigured as a source follower for signal readout in the course of switching the readout lines of an array of 3T pixel circuits in an image sensor between pixel reset and signal readout phases. In the disclosed embodiments, the readout circuitry of the array comprises a column readout line for each column of the array, with a current source load between a constant-voltage supply and the outputs of the pixel circuits of the line. A bypass switch is coupled in parallel with the current source load on each column readout line and is controlled by control circuitry. During the signal readout phase, in which the collected charge carriers are read out of the pixel circuits, the control circuitry opens the bypass switch on each column readout line, so that readout current flows through the current source load. During the pixel reset phase, in which the pixel circuits are reset, the control circuitry closes the bypass switch and thus bypasses the load.

The 3T pixel circuits may comprise any suitable type or types of transistors, such as nMOS and/or pMOS. In some embodiments, however, it is advantageous to use a pMOS-transistor in each pixel circuit as the in-pixel amplifier transistor coupling the pixel circuit to the column readout line. The use of a pMOS transistor, rather than the more conventional nMOS, is made possible by the present design and allows for a more efficient implementation of the active reset. Specifically, in the disclosed embodiments, a photoconductive film is used as the photosensitive material in the image sensor, meaning that the photocharge is not collected in the silicon substrate of the image sensor. This feature alleviates problems that can otherwise arise when a pMOS-transistor is used in a CMOS (complementary metal-oxide-semiconductor) image sensors.

In the disclosed embodiments, the in-pixel amplifier is dynamically configured as a single-stage feedback amplifier during the pixel reset phase of the sensor and as a source follower during the signal readout phase. During the pixel reset phase, when the bypass switch on the column readout line is closed, a reset transistor in the pixel circuit creates the feedback path for the single-stage feedback amplifier, and a select transistor serves as the load for the amplifier. During the signal readout phase, with the bypass switch open, the column readout line reads the photocharge through the source follower.

The disclosed design has a number of advantages over 3T pixel circuits with active reset that are known in the art. These advantages include both reduced reset noise and significantly faster reset, since there is no external loop in the case of an in-pixel reset amplifier, and the capacitance of the internal feedback loop is low, for example on the order of a few fF. The overall reset speed is further enhanced by the possibility afforded by the present design of resetting multiple rows simultaneously, since each column readout line is coupled to all rows of the column and is not used as part of the reset feedback loop.

System Description

FIG. 1 is a schematic sectional view of an image sensor 20, in accordance with an embodiment of the invention.

Image sensor 20 comprises a photosensitive medium, for example a photosensitive film 22, which converts incident photons, indicated by an arrow 34, into charge carriers (photocharge). Photosensitive film 22 is coupled by pixel electrodes 24 to pixel circuits 26, which are manufactured by known methods for manufacturing semiconductor integrated circuits on a silicon substrate 30. Photosensitive film 22 is covered by a top electrode 32, which is transparent to the incoming light. Top electrode 32 functions as a bias electrode for image sensor 20.

Photosensitive film 22 in the present example comprises a continuous blanket layer of photosensitive material. Photosensitive film 22 may comprise, for example, elemental semiconductors, compound semiconductors, colloidal nanocrystals, epitaxial quantum wells, epitaxial quantum dots, organic photoconductors, bulk heterojunction organic photoconductors, or any other suitable photosensitive material that is known in the art. These materials may be hybrid-bonded to image sensor 20, and may form, for example, photoconductors, p-n junctions, heterojunctions, Schottky-diodes, quantum well stacks, quantum wires, quantum dots, phototransistors, or combinations of these devices connected in series and parallel.

Photosensitive film 22 is effectively partitioned into an array 36 of photodetectors (pixels) 38, wherein the pixel pitch is defined by the pitch of pixel electrodes 24, as indicated by dotted lines 40. Pixel electrodes 24 are connected to respective pixel circuits 26. Optionally, individual photodetectors 38 in photosensitive film 22 can be separated by pixel isolation (not shown), which defines the size and pitch of the pixels in array 36. Top electrode 32, comprising indium tin oxide, for example, can be common for all photodetectors 38 of array 36, or may alternatively be partitioned among individual pixels or groups of pixels.

Pixel circuits 26 are coupled to control circuitry 42, a constant-voltage supply 44 ($V_{DD}$), and readout circuitry 46, as will be further detailed in FIG. 2, below. Typically (although not necessarily), array 36 comprises a two-dimensional matrix of pixels, arranged in rows and columns. In the description that follows, readout circuitry 46 is assumed (in accordance with convention in the art of image sensors) to be connected to a respective column readout line for each column of the pixels, while other signals are applied row-by-row. The terms "rows" and "columns" are assigned arbitrarily, however, and their functions, in terms of readout and application of control signals, could equally be interchanged.

FIG. 2 is a schematic circuit diagram of 3T pixel circuit 26 and associated circuitry in image sensor 20, in accordance with an embodiment of the invention. Pixel circuit 26 comprises a reset transistor 50 ($T_1$), an amplifier transistor 52 ($T_2$), and a select transistor 54 ($T_3$). In some embodiments, as mentioned above, transistors 50 and 54 are nMOS transistors, while transistor 52 is a pMOS transistor. The notation "nMOS transistor" refers to an n-type metal-oxide field-effect transistor, and the notation "pMOS transistor" refers to a p-type metal-oxide field-effect transistor. The sources, drains, and gates of the three transistors are labelled respectively as $S_n$, $D_n$, and $G_n$ for transistor $T_n$, with n=1, 2 or 3.

Photodetector 38 (PD) is coupled via a floating diffusion node 56 (FD) to gate $G_2$ of amplifier transistor $T_2$, and to source $S_1$ of reset transistor $T_1$. Gate $G_1$ of reset transistor $T_1$ is coupled to receive a RESET signal 58, issued by control circuitry 42. Drain $D_1$ of reset transistor $T_1$ is coupled to drain $D_2$ of amplifier transistor $T_2$ and drain $D_3$ of select transistor $T_3$. Gate $G_3$ of select transistor $T_3$ is coupled to receive a SELECT signal 60, issued by control circuitry 42. Source $S_2$ of amplifier transistor $T_2$ is coupled to a column readout line 62.

A current source load 64 ($I_1$) is coupled between constant voltage supply 44 and column readout line 62. A switch 66 ($SW_1$) is coupled in parallel with current source load 64. Switch $SW_1$ is alternatively closed and opened by a RESET-ENABLE signal 68 issued by control circuitry 42.

FIG. 3 is a timing diagram 70 that schematically illustrates the operation of the circuitry of FIG. 2, in accordance with an embodiment of the invention. Timing diagram 70 shows potentials at selected locations in pixel circuit 26 and its associated circuitry, as shown in FIG. 2, against a horizontal time axis. The curves depicting the potentials have been shifted from each other in a vertical direction for the sake of clarity. The same labelling as in FIG. 2 is used in timing diagram 70.

Timing diagram 70 is divided into three phases, marked by I, II, and III: Phase I is a signal readout phase, phase II is a pixel reset phase, and phase III is a reset readout phase. The start times of these three phases are labelled respectively by $t_I$, $t_{II}$, and $t_{III}$. The end of phase III is labelled by $t_{IV}$.

At $t_I$, the start of the signal readout phase, control circuitry 42 brings SELECT signal 60 to a high potential (typically equal to $V_{DD}$), and RESET signal 58 and RESET-ENABLE signal 68 to a ground potential. The levels of potentials $V_{FD}$ and $V_{CRL}$, at floating diffusion node (FD) 56 and column readout line 62, respectively, depend on the photocharge collected at the floating diffusion node.

At $t_{II}$, the start of pixel reset phase, control circuitry 42 simultaneously brings RESET-ENABLE signal 68 up to $V_{DD}$ and SELECT signal 60 down to a level $V_{BIAS}$, which is the bias potential for transistor $T_3$ while it functions as a load for transistor $T_2$ (as further detailed below). Switch 66 is thus closed, and $V_{CRL}$ accordingly rises to the level of $V_{DD}$. (As a result, it is possible to reset the pixels in multiple rows at the same time by applying the potentials described here.) After a delay of $\Delta t$, typically up to 10 ns for settling column readout line 62 to $V_{DD}$, control circuitry 42 brings RESET signal 58 up to $V_{DD}$ and, at the end of the pixel reset phase, brings it down to ground level with a tapered falling edge 72. The purpose of the taper is to enable active reset and thus reduce the kTC noise. The time scale of the taper is described further below with reference to FIGS. 4a-b.

At $t_{III}$, the start of the reset readout phase, control circuitry 42 brings RESET-ENABLE signal 68 down to ground level, opening switch 66, and brings SELECT signal 60 up to the level of $V_{DD}$.

At $t_{IV}$, the end of the reset readout phase, control circuitry 42 brings SELECT signal 60 down to ground level. This turns off select transistor $T_3$ and disables pixel source follower $T_2$.

The following describes, with reference to FIGS. 2-3, the operation of pixel circuit 26 with the associated circuitry during the three phases of signal readout (phase I), pixel reset (phase II), and reset readout (phase III):

During the signal readout phase (I), SELECT signal 60 goes high (to $V_{DD}$). Select transistor $T_3$ is in linear mode and couples drain $D_2$ of amplifier transistor $T_2$ to ground. Switch $SW_1$ is open because RESET-ENABLE signal 68 is low. Therefore, source $S_2$ of amplifier transistor $T_2$ is connected to current source load $I_1$, and operates in a source-follower mode with unity gain. Transistor $T_2$ thus transfers the potential $V_{FD}$ of floating diffusion (FD) node 56 to the potential $V_{CRL}$ of column readout line 62, from which it is read out by readout circuitry 46.

During the pixel reset phase (II), SELECT signal 60 goes down to the level of $V_{BIAS}$, so that select transistor $T_3$ operates in a saturation mode. Simultaneously RESET-ENABLE signal 68 goes high, closing switch $SW_1$ and coupling source $S_2$ of amplifier transistor $T_2$ directly to $V_{DD}$. Pixel circuit 26 now functions as a single-stage amplifier, with select transistor $T_3$ as its active load and reset transistor $T_1$ as the feedback loop of amplifier transistor $T_2$. RESET signal 58, with tapered falling edge 72, is applied to gate $G_1$ of reset transistor $T_1$. The gradual slope of falling edge 72 of RESET signal 58 provides time for the feedback loop to react, so that the single-stage amplifier suppresses or reduces the kTC noise in a time period of tens of nanoseconds. During the pixel reset phase, the potential $V_{FD}$ of floating diffusion (FD) node 56 rises to a high level (the so-called reset level), then drops with falling edge 72 of RESET signal 58 in preparation for receiving new photocharge.

In the reset read phase (III) the control signals (SELECT signal 60, RESET signal 58, and RESET-ENABLE signal 68) have the same values as in the signal readout phase (I). Switch 66 is open, and amplifier transistor $T_2$ is again in the source-follower mode. Potential $V_{FD}$ is thus transferred to potential $V_{CRL}$ of column readout line 62, and read out by readout circuit 46. This second reading of $V_{FD}$ may be utilized by readout circuitry 46 and control circuitry 42 in canceling voltage offsets in the readout path.

Figure 4A:
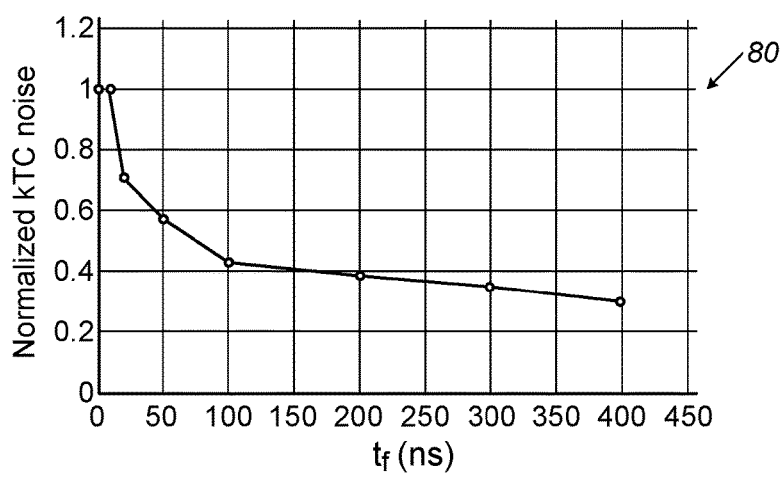
FIGS. 4*a-b* are plots that schematically show simulation results of kTC noise, in accordance with an embodiment of the invention.
Figure 4B:
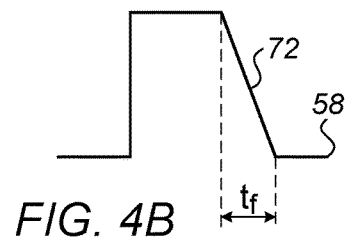

FIGS. 4a-b are plots that schematically show simulation results of kTC noise, in accordance with an embodiment of the invention. FIG. 4a is a plot 80 of calculated kTC noise as a function of a duration $t_f$ of tapered falling edge 72 of RESET signal 58. FIG. 4b shows a part of RESET signal 58 within pixel reset phase (II). As shown in FIG. 4b, duration $t_f$ is defined as the time it takes for falling edge 72 of RESET signal 58 to fall from its maximum value to its minimum value.

In plot 80, kTC noise is normalized to one for the value $t_f=0$, that is, for the case in which no taper is imposed on falling edge 72. The calculations have been performed assuming an open loop gain of 12 for amplifier transistor $T_2$. As shown in plot 80, kTC noise is suppressed by more than a factor of two for a taper length $t_f=100$ ns, and a factor of three for a taper length $t_f=400$ ns, as compared to falling edge 72 with no taper ($t_f=0$). Thus, desirably the taper length is set to be at least 100 ns, and possibly higher.

Figure 5:
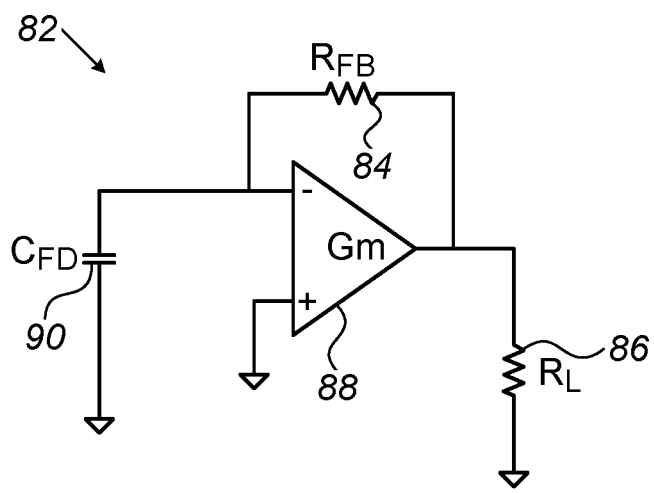
FIG. 5 is a schematic representation of an equivalent circuit for calculating kTC noise, in accordance with an embodiment of the invention.

FIG. 5 is a schematic representation of an equivalent circuit 82 used in calculating the kTC noise that was shown in FIG. 4a, in accordance with an embodiment of the invention. In circuit 82, equivalent to pixel circuit 26, the components are a feedback transistor impedance 84 ($R_{FB}$)

corresponding to transistor $T_1$, a load transistor impedance 86 ($R_L$) corresponding to transistor $T_3$, and an amplifier transistor transconductance 88 ($G_m$), corresponding to transistor $T_2$. A capacitance 90 ($C_{FD}$) corresponds to the parasitic capacitance of floating diffusion (FD) node 56.

The kTC noise power may be calculated using the method described by R. Kapusta et al. in "*Sampling Circuits That Break the kT/C Thermal Noise Limit*," IEEE Journal of Solid-State Circuits, vol. 49, pp. 1694-1701, August 2014, IEEE, New York, N.Y. Based on the above reference, the formula for kTC noise power may be written as $$\overline{V}_{FD}^2 = \frac{kT}{C_{FD}}\left(\frac{\gamma R_L}{R_L + R_{FB}} + \frac{1}{G_m R_L} + \frac{1}{G_m R_{FB}}\right),$$

wherein k is Boltzmann's constant, T is the absolute temperature, and γ is the amplifier noise factor. Of the three terms within the parenthesis, the first one describes the noise of the amplifier (which can generally be ignored), the second describes the noise of the load resistor, and the third describes the noise of the feedback resistor. Based on this formula, kTC noise decreases with an increase of open loop gain ($G_m*R_L$) and with an increase of $R_{FB}$, provided that $R_{FB}>>R_L$. The condition $R_{FB}>>R_L$ is achieved by tapered falling edge 72 of RESET signal 58.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Imaging apparatus, comprising:
 a photosensitive medium configured to convert incident photons into charge carriers;
 an array of three-transistor (3T) pixel circuits coupled to the photosensitive medium and arranged in rows and columns on a semiconductor substrate and configured to collect the charge carriers from the photosensitive medium;
 a constant-voltage supply;
 readout circuitry, comprising a plurality of column readout lines, each column readout line coupled to respective outputs of the pixel circuits in a corresponding column of the array and comprising a current source load coupled between the constant-voltage supply and the outputs of the pixel circuits, and a bypass switch in parallel with the current source load; and
 control circuitry coupled to alternately open the bypass switch on each column readout line during a signal readout phase, in which the collected charge carriers are read out of the pixel circuits, and close the bypass switch during a pixel reset phase, in which the pixel circuits are reset.

2. The imaging apparatus according to claim 1, wherein the photosensitive medium comprises a photosensitive film.

3. The imaging apparatus of claim 1, wherein each of the 3T pixel circuits comprises:
 a floating diffusion node coupled to collect the charge carriers from the photosensitive medium;
 a reset transistor having a first gate coupled to receive a reset signal from the control circuitry, a first source connected to the floating diffusion node, and a first drain;
 an amplifier transistor having a second gate connected to the floating diffusion node, a second drain connected to the first drain, and a second source connected to one of the column readout lines; and
 a select transistor having a third gate coupled to receive a select signal from the control circuitry, a third drain connected to the first and second drains, and a third source connected to a ground potential.

4. The imaging apparatus of claim 3, wherein the reset and select transistors comprise nMOS transistors, and wherein the amplifier transistor comprises a pMOS transistor.

5. The imaging apparatus of claim 1, wherein the control circuitry is configured to provide a tapered reset signal to the pixel circuits while the bypass switch is closed.

6. The imaging apparatus according to claim 5, wherein the tapered reset signal has a falling edge having a taper length of at least 100 ns.

7. The imaging apparatus according to claim 5, wherein the control circuitry is configured to apply the tapered reset signal to multiple rows of the array simultaneously.

8. The imaging apparatus according to claim 1, wherein the control circuitry is configured to reopen the bypass switch on each column readout line during a reset read phase, following the pixel reset phase.

9. A method for image sensing, the method comprising:
 providing a photosensitive medium configured to convert incident photons into charge carriers with an array of three-transistor (3T) pixel circuits arranged in rows and columns on a semiconductor substrate and configured to collect the charge carriers from the photosensitive medium;
 coupling readout circuitry, comprising a plurality of column readout lines, to respective outputs of the pixel circuits in corresponding columns of the array, each column readout line comprising a current source load coupled between a constant-voltage supply and the outputs of the pixel circuits, and a bypass switch in parallel with the current source load; and
 alternately opening the bypass switch on each column readout line during a signal readout phase, in which the collected charge carriers are read out of the pixel circuits, and closing the bypass switch during a pixel reset phase, in which the pixel circuits are reset.

10. The method according to claim 9, wherein providing the photosensitive medium comprises providing a photosensitive film.

11. The method according to claim 9, wherein each of the 3T pixel circuit comprises:
 a floating diffusion node coupled to collect the charge carriers from the photosensitive medium;
 a reset transistor having a first gate coupled to receive a reset signal from the control circuitry, a first source connected to the floating diffusion node, and a first drain;
 an amplifier transistor having a second gate connected to the floating diffusion node, a second drain connected to the first drain, and a second source connected to one of the column readout lines; and
 a select transistor having a third gate coupled to receive a select signal from the control circuitry, a third drain connected to the first and second drains, and a third source connected to a ground potential.

12. The method according to claim 11, wherein the reset and select transistors comprise nMOS transistors, and wherein the amplifier transistor comprises a pMOS transistor.

13. The method according to claim 9, and comprising providing a tapered reset signal to the pixel circuits while the bypass switch is closed.

14. The method according to claim 13, wherein the tapered reset signal has a falling edge having a taper length of at least 100 ns.

15. The method according to claim 13, wherein providing a tapered reset signal comprises applying the tapered reset signal to multiple rows of the array simultaneously.

16. The method according to claim 9, and comprising reopening the bypass switch on each column readout line during a reset read phase, following the pixel reset phase.

* * * * *